Jan. 1, 1929.
F. W. MEYER
1,697,281
ELECTROIONIC ARC DISCHARGE APPARATUS
Filed March 8, 1920     2 Sheets-Sheet 1
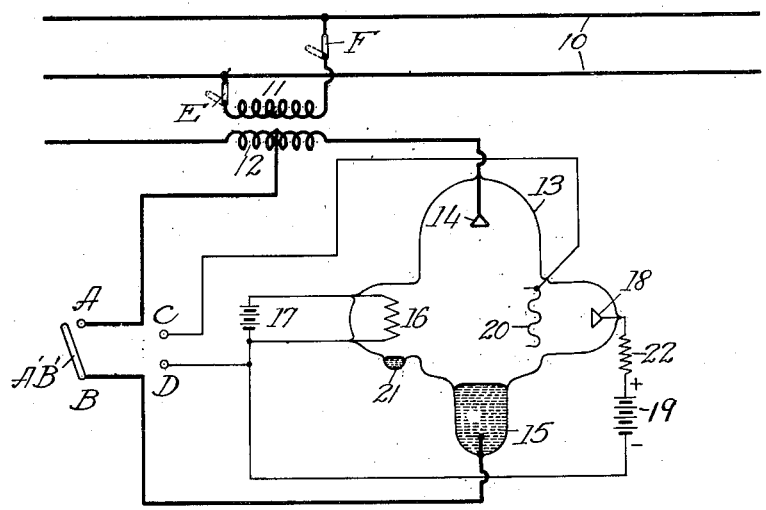
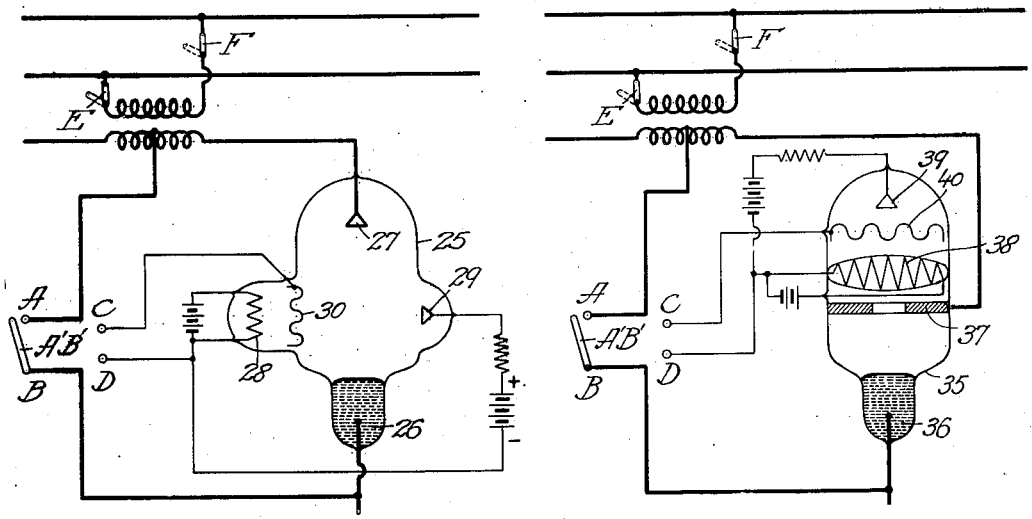
Inventor
Friedrich W. Meyer
Edwin B. H. Tower Jr
Atty.

Jan. 1, 1929.

F. W. MEYER 1,697,281

ELECTROIONIC ARC DISCHARGE APPARATUS

Filed March 8, 1920   2 Sheets-Sheet 2

Inventor
Friedrich W. Meyer
Edwin B. H. Towers Jr
Atty.

Patented Jan. 1, 1929.

1,697,281

UNITED STATES PATENT OFFICE.

FRIEDRICH WILHELM MEYER, OF MILWAUKEE, WISCONSIN, ASSIGNOR TO THE CUT-LER-HAMMER MFG. CO., OF MILWAUKEE, WISCONSIN, A CORPORATION OF WISCONSIN.

ELECTROIONIC ARC DISCHARGE APPARATUS.

Application filed March 8, 1920. Serial No. 364,071.

This invention relates to electroionic arc discharge apparatus.

One of the objects of this invention is to provide improved means for controlling and regulating the number, duration and magnitude of unidirectional current pulsations obtained from an alternating current source.

Another object is to provide in a single vessel or chamber an arc discharge path and means for securing an amplification of regulative effects upon the current in the arc discharge path.

Another object is to provide in a single vessel or chamber an arc discharge path and means for controlling the number, duration and magnitude of current pulsations flowing in the arc discharge path.

Another object is to provide improved means for obtaining amplified control effects in unidirectional current pulsations obtained from an alternating current source.

Another object is to secure such amplified control effects without moving mechanical masses.

Another object is to provide controlling and regulating apparatus which is simple, reliable and efficient.

Other objects and advantages will appear from the description and claims.

The present invention contemplates an electroionic valve of the arc discharge type having an arc discharge path in which flow current pulsations and provided with means for controlling and regulating the number of active pulsations and the duration and magnitude thereof. This control and regulation is effected by preventing the ignition of some of the current pulsations to determine the number of active pulsations, and by varying the time of ignition of such active current pulsations. To this end, the valve is provided with an auxiliary discharge path, the discharge of which controls the main arc discharge traversed by the current pulsations. The auxiliary discharge is subject to a regulable influence which may be controlled by the variations in operating conditions to which the machine to be regulated is subject.

Such electroionic arc discharge valves are particularly applicable to the regulation and control of dynamo electric machines of large capacity, although they are not limited to such use.

Embodiments and adaptations of the invention are diagrammatically shown in the accompanying drawings but it is to be understood that these are merely illustrative of several fields of application and that many other embodiments and adaptations may be made and will readily occur to those skilled in the art.

In the drawings:

Figure 1 illustrates an electroionic valve of the arc discharge type;

Figs. 2, 3, 4, 5 and 6 illustrate other forms of the valve.

Figure 4:
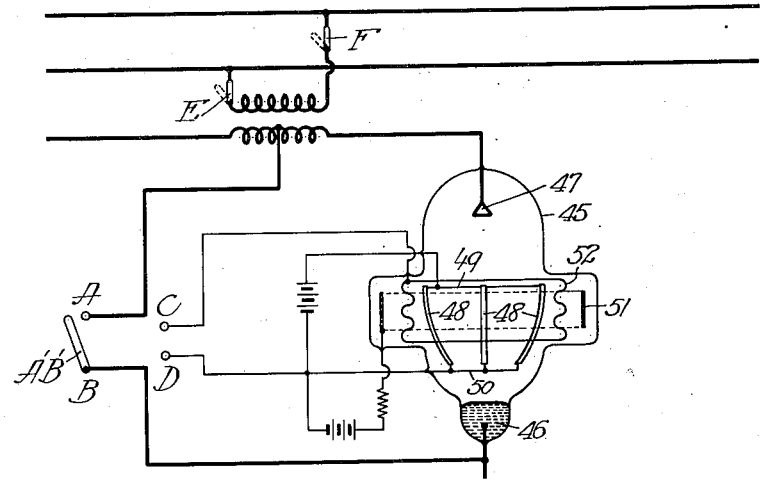

The electroionic valve comprises, in general, an evacuated vessel having a pair of main electrodes between which exists an arc discharge path, a pair of auxiliary electrodes which may take the form of an anode and a heated cathode, and another auxiliary electrode which may take the form of a grid. The potential of the grid determines the discharge between the cathode and anode which discharge controls the main arc discharge between the main electrodes. A slight change in grid potential produces a greatly magnified change in the discharge between the auxiliary cathode and anode.

The electroionic arc discharge valve may function as a rectifier for rectifying alternating currents into unidirectional pulsations, and while it will be so described it will be understood that it is not limited to such use.

Fig. 1 will first be described:

The current to be rectified and regulated is derived from an alternating current line 10 and is delivered to the electroionic valve through a transformer having a primary winding 11 and a secondary winding 12.

The electroionic valve 13 comprises a vessel which may be evacuated to the desired degree or filled with a suitable gas of relatively low pressure, such as, for example, argon. The vessel is provided with an anode 14 and a cathode 15 between which is the main arc discharge path of the device. The anode 14 is connected to one end of the transformer secondary 12. The arc cathode 15 may be in the form of mercury or any other material of self regenerating character. The vessel also contains an auxiliary cathode 16 which may be heated to a glowing condition by current from a battery 17, and an auxiliary anode 18 which may take the form of a plate. One end of the cathode 16 is connected with one pole of battery 19, the other pole of which is connected through resistance 22 to the anode 18. An auxiliary discharge path exists between the cathode 16 and the anode 18.

The vessel is preferably provided with a suitable pocket 21 located in proximity to the cathode 16 to contain a suitable material, such for example as mercury, which is adapted under the action of said heated cathode to emit or liberate vapor and thereby furnish or augment the vapor content of the vessel. The vessel also contains another electrode 20 which may take the form of a grid. Resistance 22 prevents short circuiting of the battery 19, when the resistance of the auxiliary discharge path between cathode 16 and anode 18 is reduced by the ignition of the arc between the main cathode 15 and anode 14.

The middle of the transformer secondary 12 and the cathode 15 are connected respectively to terminals A and B. Likewise the grid 20 and one end of the auxiliary cathode 16 are connected respectively to terminals C and D. The terminals A and B are for connection to the machine or circuit to be regulated and controlled and the terminals C and D are to be connected to the control circuit, or, as it may be termed, the sensitive circuit.

The currents of alternate half waves induced by the transformer pass from the anode 14 to the cathode 15. The alternating current of the supply line 10 therefore produces unidirectional current or voltage pulsations at the terminals A and B. As will more fully hereinafter appear, the magnitude of the current pulsations and discharges is determined by the voltage existing between the auxiliary cathode 16 and the auxiliary anode 18, and is controlled by the voltage impressed between the cathode 16 and the grid 20 by the sensitive or control circuit through terminals C and D.

In valves whose vessels are devoid of gaseous, vaporous or other content which is capable of ionization under the conditions imposed, the currents passing from the auxiliary anode to the auxiliary cathode, as from 18 to 16, consist of streams of electrons which are emitted from such cathode as a result of its heated condition.

If, as in the present case, the vessel contains or produces vapor, such as mercury vapor or argon, ionization takes place in the auxiliary discharge path under the influence of the electric field produced by the voltage impressed on the cathode 16 and anode 18, and on the cathode 16 and grid 20. Such ionization takes place principally in that portion of the auxiliary discharge path between the grid and anode where the velocity of the electrons is high enough. This ionization, however, does not have a marked effect upon the main discharge directly, but, since it affects the resistance and magnitude of the auxiliary discharge, an indirect effect is produced thereon. This means that ionization will also take place in the main discharge path under the influence of the electric field produced by the voltage impressed upon the main cathode and anode and of the negative electrons produced by the auxiliary discharge. Negative electrons not only flow toward the anode 18, but also toward the main anode 14, while positive ions produced by impact of the electrons with vapor or gas atoms are driven with great velocity by the electric field toward the main cathode 15. As soon as the number of ions driven toward the main cathode 15 and their kinetic energy is sufficient to create a hot spot thereon, an arc between the anode 14 and cathode 15 is ignited. Thus the main arc discharge is established.

The influence of the potential difference between the grid 20 and the cathode, or the grid potential, upon the discharge between the anode 18 and the cathode 16 is very marked. Consequently a small change in voltage in the sensitive circuit is equivalent to a comparatively great change in voltage between the cathode 16 and the anode 18. These magnified effects increase or decrease finally the ionizations in the valve to control the ignition of the pulses. Therefore the time of igniting an arc between the main anode and cathode is controlled by small differences of potential in the sensitive or control circuit.

It will be evident therefore that the ignition of a pulse may be advanced or retarded and the ignited pulse maintained, or one or more pulses may be eliminated entirely, whereby the number of active pulses and the duration and magnitude thereof are controlled and regulated by suitable means acting upon or through the control or sensitive circuit.

The arc between the main anode and cathode is automatically extinguished at the end of the voltage pulse unless it has been artificially maintained by the auxiliary discharge and previously extinguished upon the cessation of the maintaining force. The degree of ionization caused by the auxiliary discharge determines the time when the arc will be established across the arc discharge path. Consequently by controlling and regulating the ionization of the controlling and regulating electroionic or auxiliary discharge path, the ignition point of the half waves may be varied, whereby the effective portion of the half wave may be varied. The degree of ionization which is controlled by the grid potential also may determine when the arc will extinguish. It is well known that an arc has falling characteristics with so-called critical conditions for its existence, so that after an arc is ignited, it may extinguish under certain circumstances unless the supporting voltage is sufficient to maintain the arc. Therefore by controlling the supporting voltage, which is controlled by the grid potential and therefore the ionization in the vessel, the extinguishing of the arc may be controlled and regulated.

There is thus provided in a single vessel both an arc discharge path in which current pulsations are adapted to flow, and also an electroionic relay, whereby slight variations in regulating or controlling voltages are magnified and the magnified controlling effects are employed to control and regulate the number, duration and magnitude of the current pulsations flowing in the arc discharge path.

Fig. 2 shows an electroionic arc discharge valve wherein ionization in the auxiliary discharge path directly affects the main discharge.

The valve 25 comprises a vessel evacuated to the desired degree or may be either filled with a suitable gas of relatively low pressure such as, for example, argon, or provided with means for producing vapor therein.

The vessel contains a main cathode 26 and anode 27, and an auxiliary heated cathode 28, anode 29 and auxiliary anode or grid 30. By positioning the grid 30 and anode 29 on opposite sides of the vessel, ionization which takes place between the grid 30 and anode 29 directly affects the main discharge instead of only indirectly affecting it as in the valve of Fig. 1, for positive ions produced in the auxiliary path now may be driven directly to the main cathode.

The external connections of the valve of Fig. 2 are the same as for the valve of Fig. 1 and it functions in a similar way.

Fig. 3 shows a modified form of electroionic arc discharge valve wherein both the main and auxiliary discharge paths are on the same axis. The valve 35 comprises an evacuated vessel filled with a suitable gas such as argon. The vessel contains a main cathode 36 at one end and a main anode 37 positioned intermediate the ends of the vessel. The main anode 37 is annular for purposes which will more fully hereinafter appear.

The vessel also contains a heated cathode 38, an anode 39 and an auxiliary anode or grid 40. The heated cathode 38 emits the initiating electrons. Part of the positive ions formed in the auxiliary discharge path between cathode 38 and anode 39 are driven toward the main cathode 36. The cathode 38 is made in the form of a grid to allow a less obstructed passage of that part of the positive ions which are driven through an opening in the main anode 37 and strike under proper controlling conditions the main cathode 36 with sufficient force to create a hot spot and thus establish an arc between the main cathode and anode.

The external connections of this valve are the same as for the valve of Fig. 1 and it accomplishes similar results and may be employed for similar purposes.

Fig. 4 shows an electroionic arc discharge valve in which the main arc discharge path crosses the auxiliary discharge path and in which the electroionic relay electrodes are concentrically arranged.

The valve 45 comprises an evacuated vessel filled with a suitable gas such as argon and containing a main cathode 46 and main anode 47. The vessel also contains a heated cathode comprising a plurality of filaments 48 arranged in a circle and being joined at the ends by suitable conductors 49 and 50 to connect the filaments in parallel. The anode 51 forms a cylindrical plate concentrically arranged with respect to the heated cathode. The auxiliary anode or grid 52 is cylindrical and is positioned between the heated cathode and the anode 51 and concentrically arranged with respect thereto. This concentric arrangement of the heated cathode, anode 51 and grid 52 favors high ionization in the main arc discharge path, wherein are provided positive ions which have their origin in the auxiliary discharge path.

Figure 5:
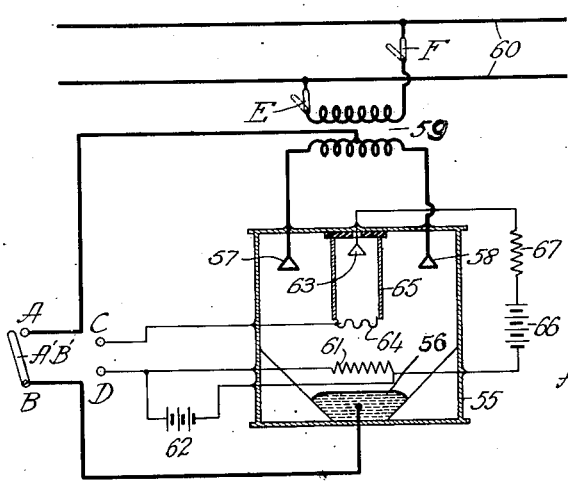

Fig. 5 shows an electroionic valve of the arc discharge type provided with two main arc discharge paths whereby both waves of alternating current may be rectified.

The valve 55 comprises a steel chamber evacuated to any desired degree, and may be filled with a suitable gas such as argon. The chamber contains a main cathode 56 and two main anodes 57 and 58. The main anodes are connected with opposite ends of the secondary of a transformer 59 through which alternating current is supplied from an alternating current line 60. The mid point of the transformer secondary is connected to terminal A and the main cathode to terminal B.

The chamber 55 also contains an auxiliary cathode 61 heated from a battery 62, an auxiliary anode 63, and a second auxiliary anode or grid 64. The grid 64 is connected to the terminal C and one end of the heated cathode 61 to the terminal D. One end of the heated cathode 61 is connected through a battery 66 and a protecting resistance 67 to the anode 63. Electroionic arc discharge valves having steel chambers are of high capacity, and in order to prevent interference between anodes, the auxiliary anode 63 is positioned within an enclosing cylinder 65 of suitable material, such as steel, which is preferably insulated from the chamber.

Figure 6:
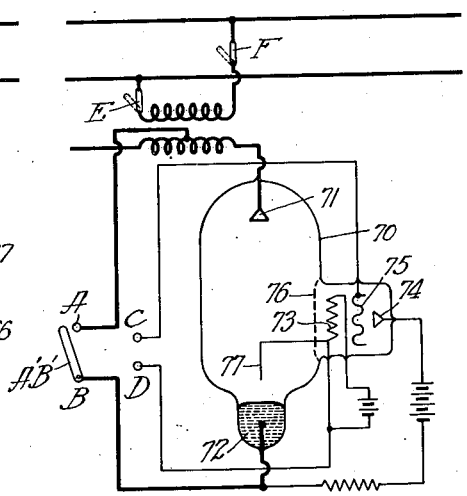

Fig. 6 shows an electroionic arc discharge valve in which a special ignition electrode is included in the controlled circuit of the electroionic relay portion of the combined valve. This arrangement is similar to some of the arrangements disclosed in my copending applications Serial Numbers 142,243, filed January 13, 1917, 206,356, filed December 8, 1917, and 212,946, filed January 21, 1918, but differs therefrom principally in that but one vessel is employed to enclose both the arc discharge and ignition electrodes and the electroionic relay or auxiliary control electrodes.

The valve 70 comprises an evacuated vessel filled with a suitable gas such as argon. The vessel contains a main anode 71 and main cathode 72, the latter being of mercury. The vessel also contains an auxiliary heated cathode 73, an auxiliary anode 74 and a second auxiliary anode or grid 75. The cathode 73, anode 74 and grid 75 are arranged in a pocket separated from the main portion of the vessel by a suitable grid-like partition 76 which prevents to some extent a mixing of the main and auxiliary discharges but allows a common evacuated vessel to be used for both the arc and the relay electrodes. A special ignition electrode 77 is connected with one end of the heated auxiliary cathode 73.

The ignition gap between the ignition electrode 77 and the main cathode 72 is included in the circuit which includes the auxiliary discharge controlled by the potential of the grid 75. Therefore, when the voltage of this circuit is sufficient the ignition gap will be bridged thereby causing an arc to be established between the main cathode 72 and main anode 71.

The outside connections of the valve of Fig. 6 are the same as for the valve of Fig. 1, and may be employed for similar purposes.

What is claimed is:

1. An electroionic arc discharge valve comprising a vessel, means providing within said vessel a path for a main arc discharge and a path for an auxiliary electroionic discharge and also providing for influence of the former discharge by the latter and means for modifying the degree and character of such influence.

2. An electroionic arc discharge valve comprising a vessel, means providing within said vessel paths for main arc and auxiliary discharges and also providing for influence of the former discharge by the latter discharge and an auxiliary electrode to be subjected to a regulable influence for modifying the auxiliary discharge to thereby regulate the main arc discharge.

3. An electroionic arc discharge valve comprising a vessel, main electrodes providing therebetween and within the vessel a path for a main arc discharge, auxiliary electrodes providing therebetween a path for an auxiliary discharge, said main and auxiliary electrodes being so associated as to provide for control of the main arc discharge by the auxiliary discharge.

4. An electroionic arc discharge valve comprising a vessel, electrodes providing within said vessel a path for a main arc discharge and auxiliary electrodes so associated with said former electrodes as to provide for control of the main arc discharge by an auxiliary discharge between certain of said latter mentioned electrodes, said latter mentioned electrodes including electrode means for modifying the auxiliary discharge to thereby control the main arc discharge.

5. An electroionic arc discharge valve comprising a vessel, main electrodes providing therebetween and within the vessel a path for a main arc discharge, auxiliary electrodes providing therebetween a path for an auxiliary discharge, said main and auxiliary electrodes being so associated as to provide for control of the main arc discharge by the auxiliary discharge and an additional electrode, to be subjected to a regulable influence, associated with said other electrodes to provide for variation of the auxiliary discharge in accordance with the character and value of such influence.

6. Means for controlling electrical conditions of a circuit comprising a vessel, main electrodes to be included in said circuit and providing therebetween and within a said vessel, a path for a main arc discharge, auxiliary electrodes providing therebetween and within said vessel a path for an auxiliary electroionic discharge so associated with the main arc discharge as to provide for control of the latter by the former and means subjected to influence in accordance with variations in an electrical condition of said circuit for influencing said auxiliary discharge to thereby control said main arc discharge.

7. The method of controlling an electrical condition of a circuit which comprises causing an electroionic arc discharge therein, subjecting said arc discharge to control by an auxiliary electroionic discharge and subjecting said auxiliary discharge to a regulable electrical influence.

8. The method of controlling an electric condition of a circuit which comprises causing an electroionic arc discharge therein controlling said arc discharge by an auxiliary electroionic discharge and subjecting said auxiliary discharge to influence in accordance with the variations in an electric condition of said circuit for varying the control of said main arc discharge in a manner to compensate for such variations.

9. The method of controlling electrical conditions of a circuit which comprises including in such circuit an electroionic arc discharge, subjecting said discharge to control by an auxiliary electroionic discharge and subjecting said auxiliary discharge to influence in accordance with the degree and character of variations in electrical conditions of the circuit to be controlled.

In witness whereof, I have hereunto subscribed my name.

FRIEDRICH WILHELM MEYER.